United States Patent
Furukawa et al.

[11] Patent Number: 5,826,988
[45] Date of Patent: Oct. 27, 1998

[54] CAGE FOR NEEDLE ROLLER BEARINGS AND METHOD OF PRODUCING SAME

[75] Inventors: Taichiro Furukawa, Hamamatsu; Kyouzi Maeda, Iwata, both of Japan

[73] Assignee: NTN Corporation, Osaka, Japan

[21] Appl. No.: 773,350

[22] Filed: Dec. 26, 1996

[30] Foreign Application Priority Data

Dec. 28, 1995 [JP] Japan .................................. 7-343493
Jun. 28, 1996 [JP] Japan .................................. 8-170030

[51] Int. Cl.⁶ ...................................................... F16C 33/46
[52] U.S. Cl. ............................................................ 384/572
[58] Field of Search .................... 384/572, 576, 384/575, 580, 578

[56] References Cited

U.S. PATENT DOCUMENTS 4,978,237 12/1990 Motohashi et al. ..................... 384/572
5,011,305 4/1991 Breuer et al. ............................ 384/572

*Primary Examiner*—Lenard A. Footland
*Attorney, Agent, or Firm*—Nikaido, Marmelstein, Murray & Oram LLP

[57] ABSTRACT

The present invention is intended to dispense with the post-processing of the pocket guide surfaces while securing the precision thereof, to improve the precision of the cage and to reduce the manufacturing cost. A cage (1) according to the present invention is formed such that the inner wall surfaces of the thin-walled and thick-walled portions (1a) and (1b) are continuous with each other through taper surfaces (1d) inclined toward the centers and the guide surfaces (1c1) of the pocket (1e) are shearing surfaces q on the pitch circle PCD.

4 Claims, 6 Drawing Sheets

CAGE FOR NEEDLE ROLLER BEARINGS AND METHOD OF PRODUCING SAME

BACKGROUND OF THE INVENTION

The present invention relates to a cage for needle roller bearings and a method of producing the same.

Needle roller bearings are used, for example, as connecting rod bearings for engines used in two-wheeled vehicles and snowmobiles. Needle roller bearings of this type have a cage 11 of the shape shown in Figs. 5A and 5B for retaining needle rollers at circumferentially equal intervals. The cage 11 comprises an annular body of substantially U-shaped cross section whose central portion is thin-walled and whose opposite end portions are thick-walled, with a pocket 11c punched over a region extending from the thin-walled portion 11a in the center to each of the thick-walled portions 11b in the opposite end portions. The circumferential dimension of the central portion of the pocket 11c is greater than that of the opposite end portions, and the peripheral wall surfaces of the opposite end portions serve as guide surfaces 11c for guiding the needle roller received in the pocket. The thin-walled portion 11a and the two thick-walled portions 11b are continuous with each other through substantially vertical wall surfaces 11d.

The cage 11 as described above has conventionally been produced by the method shown in FIGS. 4A and 4B. First, as shown in FIG. 4B, an annular cage blank 11' of substantially U-shaped cross section in which the central portion is thin-walled and the opposite end portions are thick-walled is fabricated. The inner wall surfaces of the thin-walled portion 11'a and the both thick-walled portions 11'b of the cage blank 11' are continuous with each other through substantially vertical wall surfaces 11'd. Then, as shown in FIG. 4A, the outer diameter of the cage blank 11' is received in a die 13 and fixed in position by a chuck 14 while a punch 12 is pressed against the cage blank 11' from the inner diameter side, thereby effecting punching (shearing) to form the pocket 11c.

Generally, shearing means working using two cutting edges (punch and die) to apply a shearing force to a plate material so as to cut it to a required shape and size, and it is to be noted that the shearing of a blank proceeds with the both cutting edges cutting into the blank until plastic deformation takes place in the blank, whereupon a crack starts at the cutting edges to complete the shearing. FIG. 6 schematically shows a cut end when shearing is effected by defining an appropriate clearance between the punch and the die. The shearing surface q is a surface which is formed when the blank is deformed by being pressed as it is rubbed by the lateral surfaces of the cutting edges in the course of shearing; it is also called a burnished surface in the sense that it is a surface deformed on the same principle as that of burnishing. The surface quality is satisfactory. In contrast, the broken surface r is a surface formed as the blank is torn and deformed by a breaking force; it is recessed with respect to the shearing surface and is considerably rough.

As shown In FIGS. 5A and 5B, a conventional cage 11 has a broken surface r present in the pitch circle PCD (the same as the pitch circle of needle rollers received) of the guide surfaces 11c1 of the pocket 11. Therefore, if the cage is used in the as-sheared state, the needle roller would be prevented from properly rolling as it comes into contact with the broken surface on the pitch circle PCD. Thus, after shearing, it has been common practice to post-process the guide surfaces 11c1 as by cutting. In this connection, the following problems arise.

(1) The parallelism of the pocket 11c with respect to the axis of the cage 11 is degraded;

(2) The precision of the guide surfaces 11c is lowered owing to degradation of the sharpness of the cutting tool;

(3) Manufacturing cost increases.

Now, the formation of the broken surface r on the pitch circle PCD of the guide surfaces 11c1 is due to the uneven wall thickness of the cage blank 11' and the relation between the shape of the cage blank 11' and the shape of the cutting edge of the punch 12. That is, as shown in FIG. 4A, the cutting edge of the punch 12 is substantially V-shaped in the central region (central cutting edge portion 12a), and during working, the central cutting edge portion 12a first abuts against the inner wall surface of the thin-walled portion 11'a of the cage blank 11' and then the cutting edge portions 12b at the opposite end portions abut against the inner wall surfaces of the thick-walled portions 11'b. On the other hand, since the thin-walled portion 11'a is thin in the wall, the portion 11'a tend to deform toward the die 13 by the pressing force from the punch 12. As a result, there occurs a phenomenon in which the thick-walled portions 11'b of the cage blank 11' tend to escape to the central region. The escape of the thick-walled portions 11'b is at a maximum when the overall region of the central cutting edge portion of the punch 12 abuts against the thin-walled portion 11'a, whereupon the cutting edge portions 12b of the punch 12 at the opposite end portions are positioned on the pitch circle PCD of the guide surfaces 11c1. For this reason, the broken surface r is formed on the pitch circle POD of the guide surfaces 11c1.

SUMMARY OF THE INVENTION

The present invention, accomplished with the above in mind, is intended to dispense with the post-processing of the pocket guide surfaces while securing the precision thereof, to improve the precision of the cage and to reduce the manufacturing cost.

The present invention provides a cage for needle bearings, comprising an annular body of U-shaped cross section whose central portion is thin-walled and whose opposite end portions are thick-walled, with a pocket punched over a region extending from the thin-walled portion in the center to the thick-walled portions in the opposite end portions, said cage for needle bearings being characterized in that the guide surface of the pocket for guiding a needle roller is a shearing surface on the pitch circle.

The term "shearing surface" refers to a portion of the cut end resulting from shearing, i.e., the shearing surface q described in connection with FIG. 6. The corners of the pocket are preferably formed with rounded portions circumferentially recessing from the guide surfaces by a predetermined amount. The amount of recessing of the rounded corners is desirably 5% of the roller diameter.

The invention also provides a method of producing cages for needle roller bearings, comprising the steps of fabricating an annular cage blank of U-shaped cross section whose central portion is thin-walled and whose opposite end portions are thick-walled, the inner wall surfaces of said thin-walled and thick-walled portions being continuous with each other respectively through a taper surface inclined toward the center, and punching a predetermined portion extending from the thin-walled portion to the opposite thick-walled portion by a punch on the inner diameter side and a die on the outer diameter side, wherein the punch is formed with taper cutting edge portions having a corresponding taper angle for the two taper surfaces, the central cutting edge portion between the taper cutting edge portions being recessed, the processing being initiated with the taper cutting edge portions of the punch being applied to the corresponding taper surfaces.

At this time, the four corners of the punch are desirably formed with projections of arcuate cross section which project in the circumferential direction.

In this invention, without requiring any post-processing, it becomes possible to secure the precision of the pocket guide surfaces, improve the cage precision and reduce the manufacturing cost.

DESCRIPTION OF THE PREFERRED EMBODIMENTS

Figure 1A:
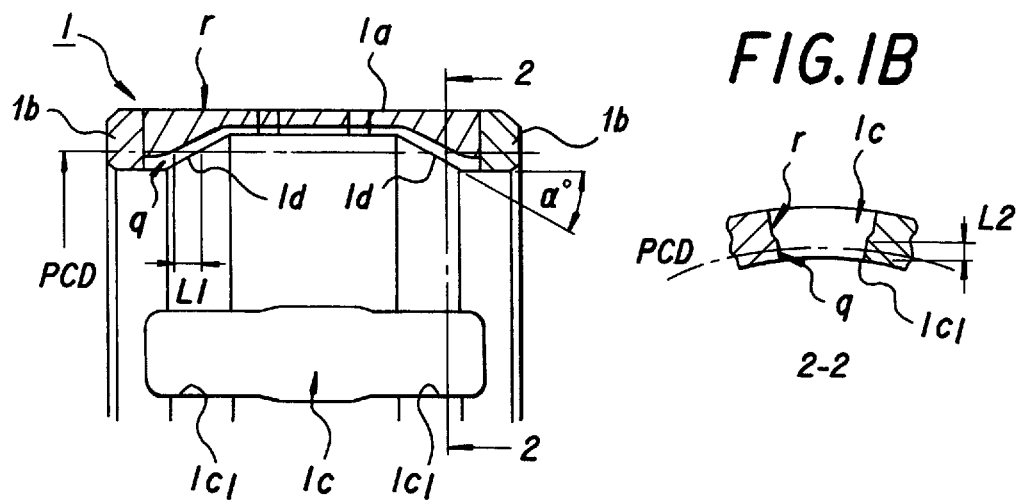
FIG. 1A is longitudinal section of a cage according to an embodiment.
Figure 1B:
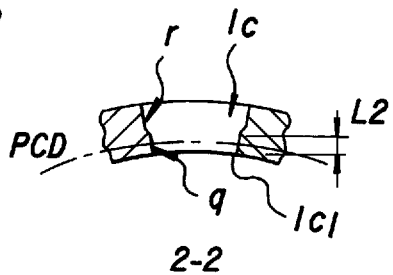
FIG. 1B is a view of X—X section in a pocket portion in FIG. 1A.

Embodiments of the invention will now be described with reference to the drawings, FIGS. 1A and 1B show a cage 1 needle roller bearings according to an embodiment of the invention. The cage 1 is comprised of an annular body of substantially U-shaped cross section, whose central portion is thin-walled and whose opposite axial end portions are thick-walled, with a pocket 1c1 punched over a region extending from the thin-walled portion 1a in the central portion to each of the thick-walled portions 1b in the opposite end portions. The circumferential dimension of the central portion of the pocket 1c is greater than that of the opposite side portions, and the peripheral wall surfaces of the opposite side portions serve as guide surfaces 1c1 for guiding the unillustrated needle roller.

Figure 5A:
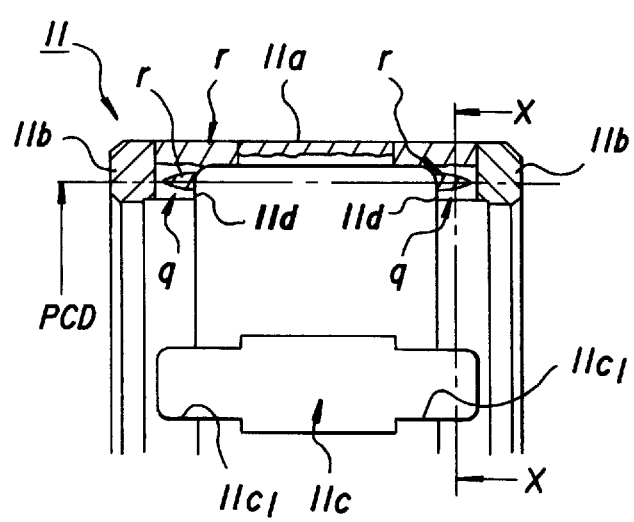
FIG. 5A is a longitudinal section of a conventional cage.
Figure 5B:
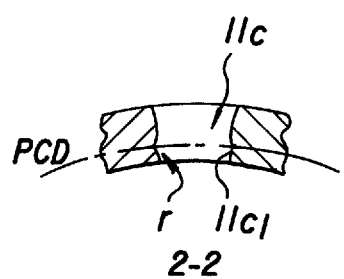
FIG. 5B is an X—X section of the pocket portion in FIG. 5A.
Figure 6:
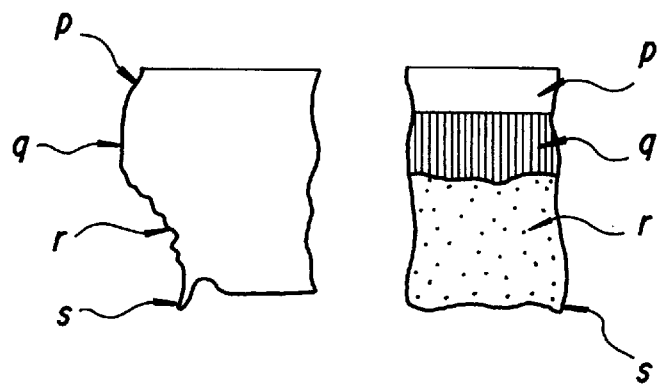
FIG. 6 is a view schematically showing an ordinary cut end when shearing operation is affected.

The points in which the cage 1 of this embodiment differs from the conventional cage 11 shown in FIG. 5A are that the inner wall surfaces of the thin-walled and thick-walled portions 1a and 1b are continuous with each other through a taper surface 1d (the angle of inclination with respect to the axis being shown as α°) which is inclined toward the center or Inclined such that the radius is gradually increased toward the center and that the guide surfaces 1c1 of the pocket 1c are shearing surfaces q (shown white on a colored background). Thus, by making the guide surfaces 1c1 on the pitch circle PCD in the form of shearing surfaces q, the needle roller is guided by the shearing surfaces q, so that the proper rolling thereof is assured.

In addition, when the axial width (L1) on the pitch circle PCD of the shearing surfaces q in FIG. 1A and the radial width (L2) on the pitch circle PCD of the shearing surfaces q in FIG. 1B were measured for angles of inclination α of 30° and 45° after the pocket had been punched by the means to be later described, it was found that the dimensions of L1 and L2 were about 0.5 mm or more in each case for α=30° and α=45°. Further, a strength analysis was made of the cage post for the angles of inclination α=30° and 45°, it was found that α=45° was more advantageous in terms of strength.

Figure 2:
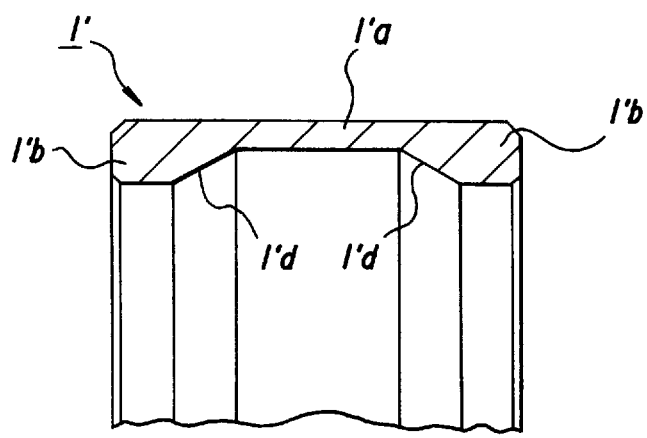
FIG. 2 is a longitudinal section of a cage blank according to an embodiment.
Figure 3:
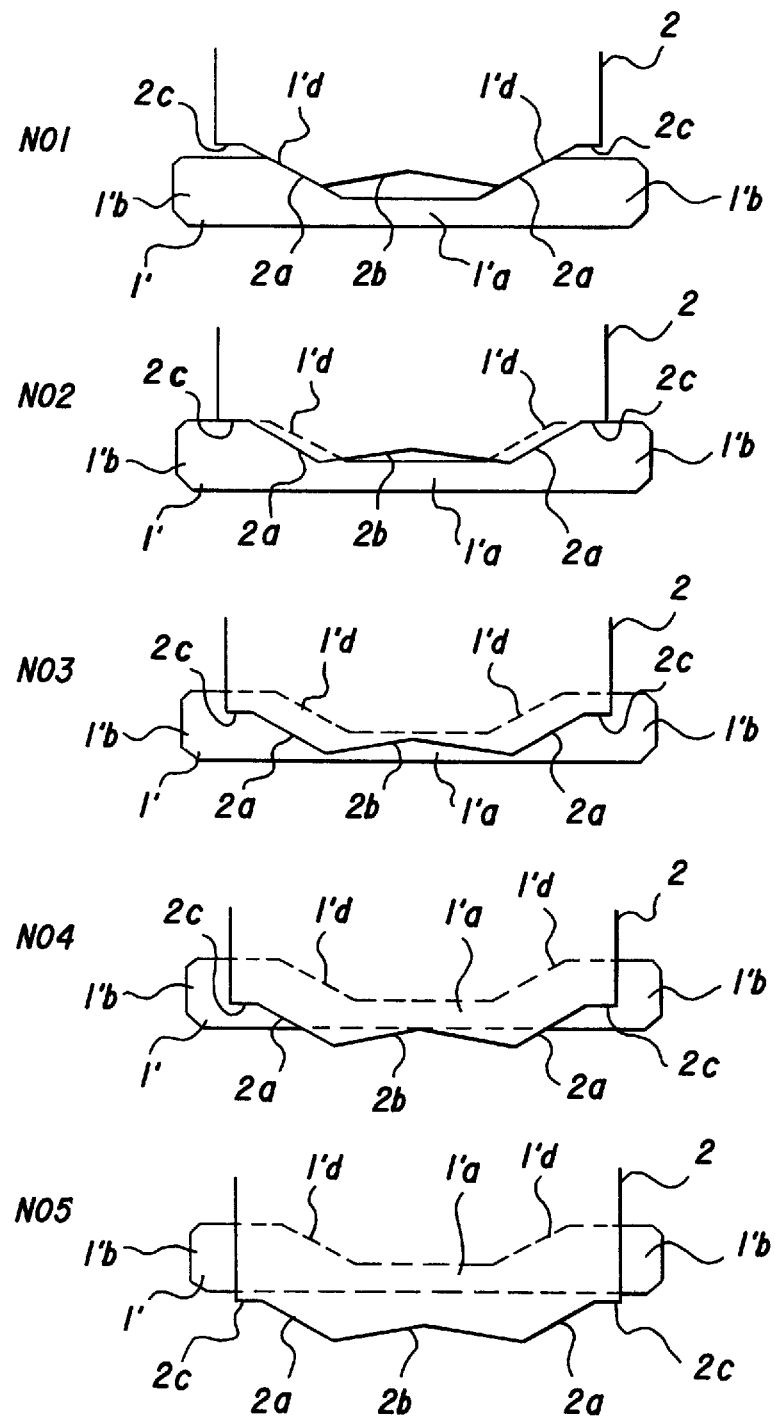
FIG. 3 is a sectional view showing, in time series, the manner of punching according to an embodiment.
Figure 4A:
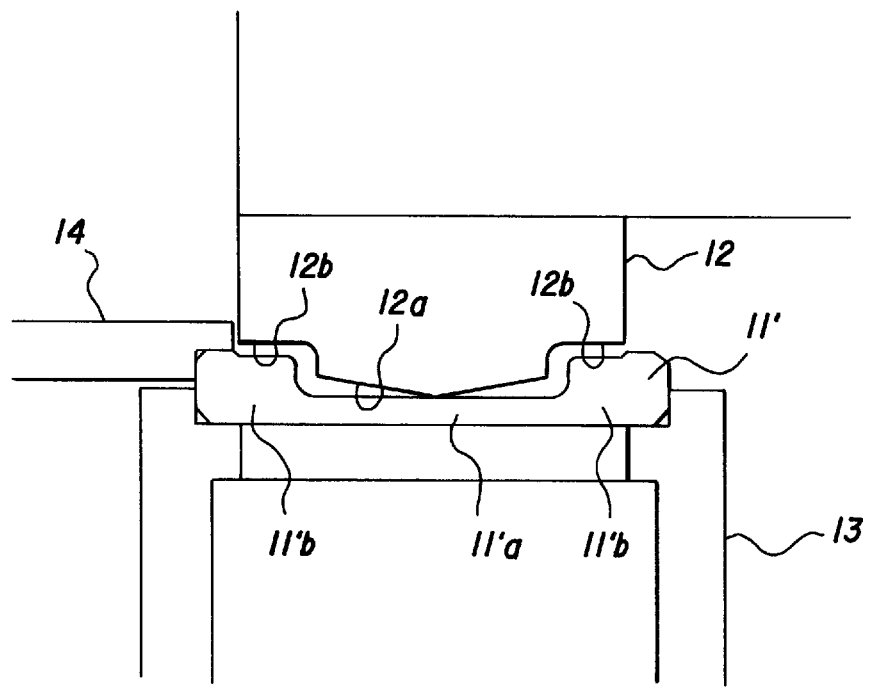
FIG. 4A is a sectional view showing the manner of punching a pocket of conventional form.
Figure 4B:
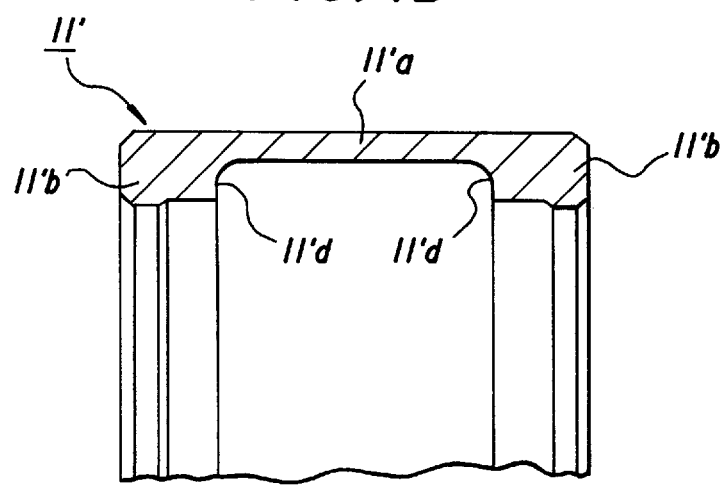
FIG. 4B is a longitudinal of a cage blank of conventional form.

The cage 1 of this embodiment can be produced by punching (shearing) the cage blank 1' shown in FIG. 2 to form a pocket 1c by using a punch 2 shown in FIG. 3 and a die (not shown).

As shown in FIG. 2, the cage blank 1' is obtained by cutting or pressing a steel plate pipe blank and is an annular body having a thin-walled portion 1'a in the central portion, thick-walled portions 1'b in the opposite end portions, and taper surfaces 1'd continuous with the inner wall surfaces of the thin-walled and thick-walled portions 1'a and 1'b. The taper surfaces 1'd are continuous with the inner wall surface of the thin-walled portion as they are each inclined from the inner wall surface of the associated thick-walled portion 1'b to the central region.

As shown in FIG. 3, the cutting edge of the punch 2 is substantially W-shaped and comprised of taper cutting edge portions 2a having a taper angle (which is equal to the angle of inclination α° of the taper surfaces 1'd) corresponding to the respective taper surfaces 1' of the cage blank 1', a central cutting edge portion 2b recessed between the taper cutting edge portions 2a, and straight cutting edge portions 2c at the opposite ends.

The outer diameter of the cage blank 1' is received in an unillustrated die and fixed in position by an unillustrated chuck, and the punch 2 is pressed against the cage blank 1' from the inner diameter side, thereby punching (shearing) a pocket 1c. During this operation, the taper cutting edge portions 2a of the punch 2 abut against the associated taper surfaces 1' of the cage blank 1' (NO. 1), then the straight cutting edge portions 2c abut against the inner wall surfaces of the thick-walled portions 1'b (NO. 2), and the central cutting edge portion 2b abuts against the thin-walled portion 1'a (NO. 3), thereby punching the pocket portion (NO. 4, NO. 5).

When the taper cutting edges 2a of the punch 2 come in taper contact with the taper surfaces 1'd of the cage blank 1', the thick-walled portions 1'b of the cage blank 1' receive pressure components directed to the opposite sides from the punch 2. Thus, this results in preventing escape of the material in the thick-walled portions 1'b during processing, and therefore the region on the pitch circle PCD of the guide surfaces 1c1 does not become a broken surface (shown in a mesh pattern) and instead it is finished as a shearing surface q. Therefore, without requiring any post-processing, it becomes possible to secure the precision of the pocket guide surfaces, improve the cage precision and reduce the manufacturing cost.

Figure 7:
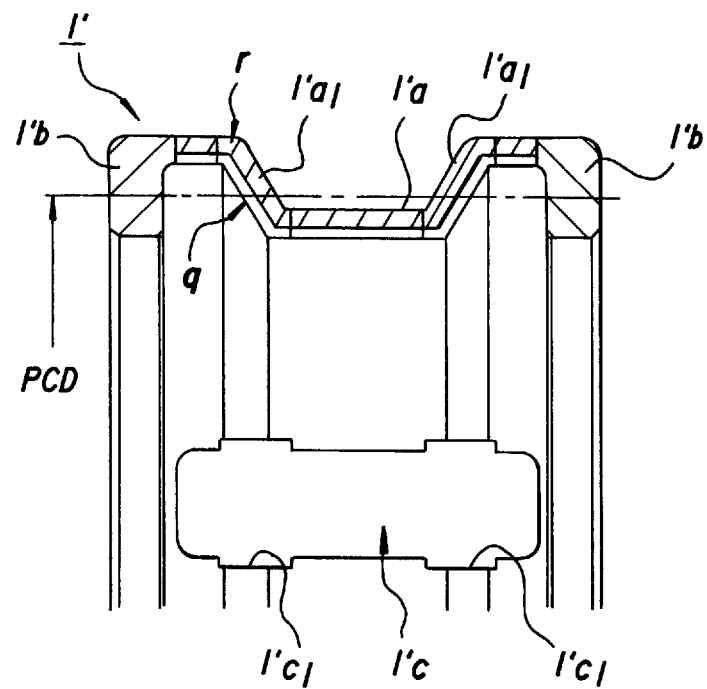
FIG. 7 is a longitudinal section of a cage according to another embodiment.

The cage 1' shown in FIG. 7 is comprised of an annular body of substantially M-shaped cross section whose central portion is thin-walled and whose opposite end portions are thick-walled, having a pocket 1'c punched in the central thin-walled portion 1'a. The wall surfaces of the pocket 1'c corresponding to the inclined portions 1'a1 of the thin-walled portion are guide surfaces 1'c1 for guiding an unillustrated needle roller. The guide surfaces 1'c1 of the pocket 1'c are shearing surfaces q in the vicinity of the pitch circle PCD.

Figure 8A:
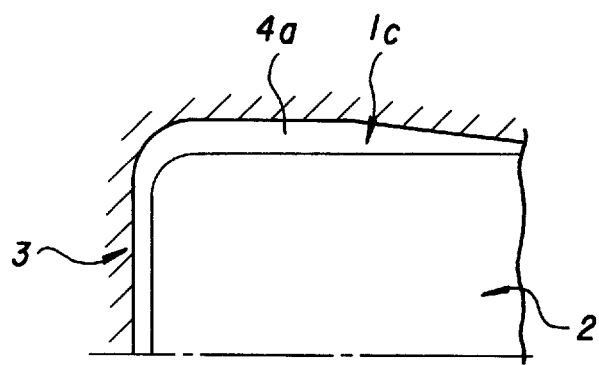
FIG. 8A is an enlarged sectional view showing the manner of punching a conventional pocket.
Figure 8B:
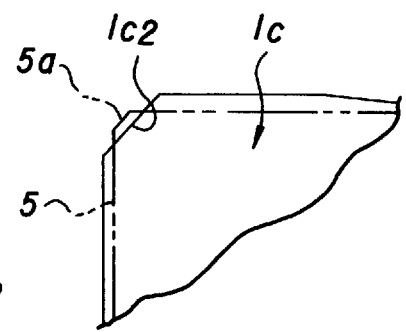
FIG. 8B is a plan view showing the shape of the pocket after punching.

Generally in the case where the clearance between the die and punch is too small, there is formed a portion which projects in the shearing portion, said portion being sometimes burnished to form a so-called secondary shearing surface. Since such secondary shearing surface is formed at a position which projects more than that for the primary shearing surface, it is necessary to avoid the formation of a secondary shearing surface so as not to interfere with the rolling of the roller. As a means therefor, it may be contemplated, as shown in FIG. 8A, to make larger (about 1.6 times) than usual the clearance between the punch 2 and the die 3 extending from a corner of the pocket to the guide surface. With this means, however, there may be a case where, as shown in FIG. 8B, the corner portion 1c2 of the pocket 1c remains without being well punched, in which case the remaining portion 1c2 would interfere with the corner portion 5a of the needle roller 5 to damage the rolling of the roller 5.

Figure 9:
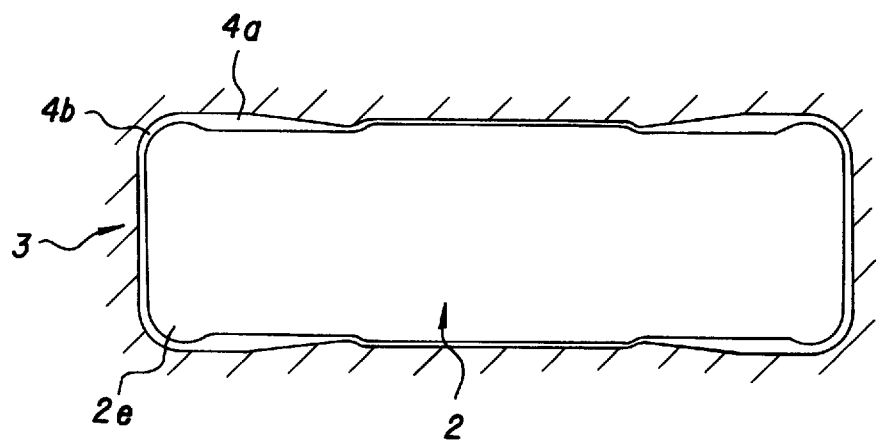
FIG. 9 is a sectional view of a punch and a die according to an embodiment.

To solve this problem, as shown in FIG. 9, it is recommendable to provide circumferentially directed projections 2e of arcuate cross section in the corners of the punch 2. At this time, the clearance 4a in the guide surface is, e.g., 12% of the plate thickness so that it is greater than the clearance 4b in the projection 2e, e.g., 6% of the plate thickness.

Figure 10:
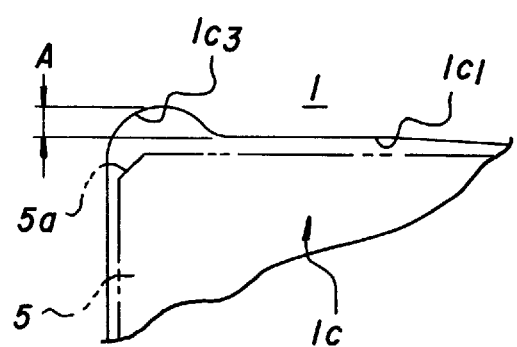
FIG. 10 is an enlarged plan view of a pocket formed by the punch and die.

Thus, after the punching of the pocket 1c, there are formed in the four corners, as shown in FIG. 10, rounded corner portions 1c3 of arcuate cross section circumferentially recessing by a predetermined amount from the guide surfaces 1c1. As a result, there is no danger of the corners of the pocket 1c interfering with the corners 5a of the roller 5, thus ensuring smooth rolling motion of the roller 5. Further, even if the chamfering curvature of the corners 5a of the roller 5 is made small, there is no possibility of interference with the corners of the pocket, so that the time required for chamfering the roller 5 can be shortened. Further, since the curvature of the corners of the pocket becomes large as compared with the conventional article, it is possible to mitigate the stress concentration and improve the fatigue strength of the cage 1. Further, since the rounded corners 1c3 serve as passages for the lubricant, the lubricating characteristics of the bearing can be improved. In the rounded corners 1c3 are too large, this will entail a decrease in the strength of the cage 1; thus, it is desirable that the amount A by which the rounded corners 1c3 circumferentially recess be 5% of the roller diameter.

What is claimed is:

1. A cage for needle roller bearings, comprising an annular body having a thin-walled portion in a center of said cage along an axial direction, thick-walled portions on both axial sides of said thin-walled portion, a plurality of pockets punched over a region extending from said thin-walled portion to each of said thick-walled portions, and guide surfaces for guiding needle rollers, wherein said guide surfaces of said pockets comprise shearing surfaces formed at both sides of each of said pockets in a circumferential direction in said thick-walled portions of said cage, said shearing surfaces being disposed on inner sides, in a radial direction, of those portions of said pockets intersecting with a pitch circle of said cage, and wherein a breaking surface is disposed at an outer side, in said radial direction, of said pockets.

2. A cage for needle roller bearings as set forth in claim 1, wherein the corners of said pockets are provided with rounded corner portions circumferentially recessing from said guide surfaces.

3. A cage for needle roller bearings as set forth in claim 2, wherein the amount of recession of said rounded corner portions is about 5% of said roller diameter.

4. A cage for needle roller bearings as set forth in claim 2, wherein inner wall surfaces of said thin-walled and thick-walled portions are continuous with each other through a tapered surface inclined toward the center.

* * * * *